United States Patent [19]
Yoshida et al.

[11] 3,936,707
[45] Feb. 3, 1976

[54] OPERATING APPARATUS FOR ELECTRICALLY DRIVEN VEHICLES

[75] Inventors: Susumu Yoshida; Masaharu Suzuki, both of Tokyo, Japan

[73] Assignee: Kabushiki Kaisha Meidensha, Tokyo, Japan

[22] Filed: Feb. 12, 1974

[21] Appl. No.: 441,809

[30] Foreign Application Priority Data
Feb. 14, 1973  Japan............................48-19356
Oct. 15, 1973  Japan..........................48-115590
Oct. 15, 1973  Japan..........................48-115591
Oct. 15, 1973  Japan..........................48-115592
Nov. 29, 1973  Japan..........................48-133732
Nov. 29, 1973  Japan..........................48-133733

[52] U.S. Cl................................. 318/139; 318/373
[51] Int. Cl.² ............................................ H02P 5/06
[58] Field of Search........................... 318/139, 373

[56] References Cited
UNITED STATES PATENTS

| | | | |
|---|---|---|---|
| 3,349,309 | 10/1967 | Dannettell | 318/139 X |
| 3,710,216 | 1/1973 | Smith | 318/373 |
| 3,716,767 | 2/1973 | Kuriyama et al. | 318/139 |
| 3,764,870 | 10/1973 | Morton | 318/139 |
| 3,826,959 | 7/1974 | Anderson | 318/139 |
| 3,828,235 | 8/1974 | Price et al. | 318/373 |

*Primary Examiner*—Robert K. Schaefer
*Assistant Examiner*—W. E. Duncanson, Jr.
*Attorney, Agent, or Firm*—Haseltine, Lake & Waters

[57] ABSTRACT

An operating apparatus for electrically driven vehicle, for example a fork lift truck, of the type that has an electric motor connected to a DC source via a chopper circuit. The apparatus includes a relay for supplying DC power to said motor, a switching element for operating the relay and a transistorized detector circuit pararelly connected to said switching element which sense the normal operation of the chopper circuit, and makes the switching element non-conductive in the event of malfunctioning. Further, the apparatus includes a chopper control circuit for controlling the chopper circuit effectively and a overcurrent detector circuit for control chopper current by detecting the overcurrent.

16 Claims, 14 Drawing Figures

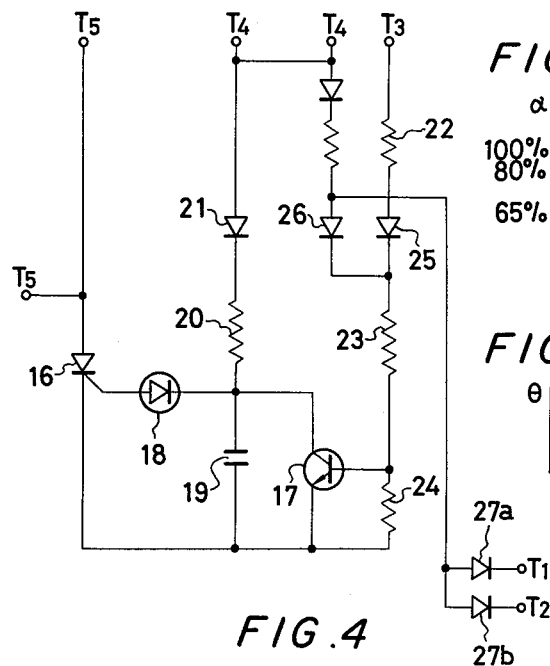
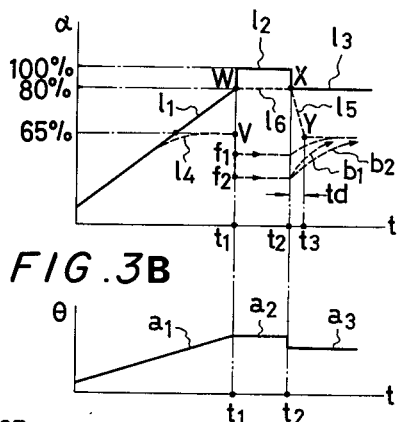
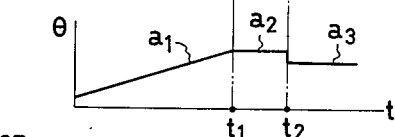
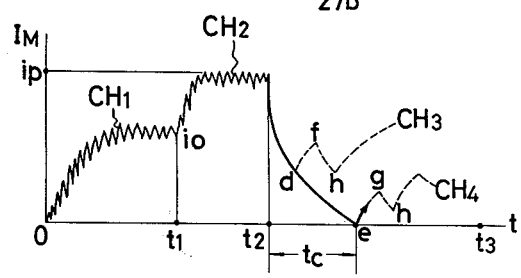
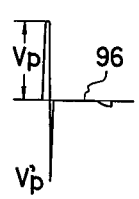
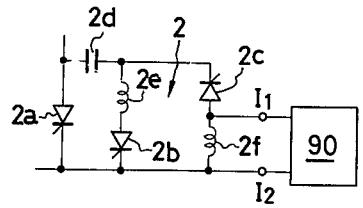
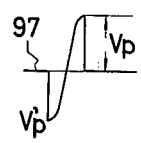

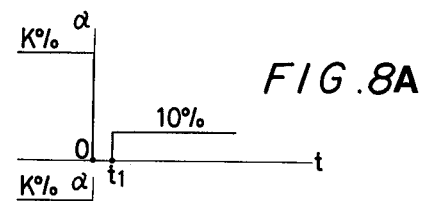
FIG.8A
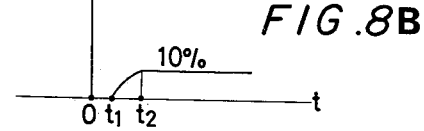
FIG.8B
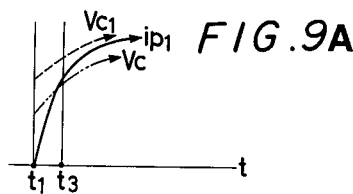
FIG.9A
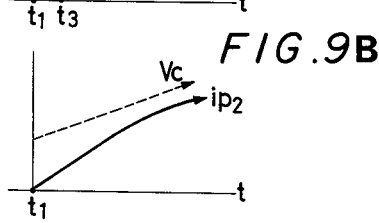
FIG.9B
FIG.10
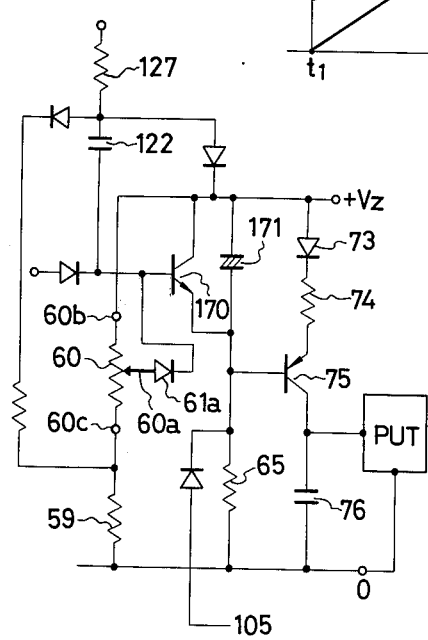

OPERATING APPARATUS FOR ELECTRICALLY DRIVEN VEHICLES

This invention relates to electrically driven vehicles of the type which includes a DC power source and an electric motor, this invention relates to an operating apparatus for such vehicles.

In prior art electrically driven vehicles, the power is supplied from a DC source carried by the vehicle to the electric motor associated with the transmission system by means of a chopper circuit. The chopper basically functions as a voltage regulator and permits the operator to exercise a continuously variable degree of control over the speed of the motor and, hence, of the vehicle. In such prior art arrengements, when the voltage applied to the electric motor attains some predetermined value, which is close to the voltage of the DC source, the contacts of a relay close, thereby supplying the full voltage of the DC source to the motor. In vehicles of this type, the voltage across electric motor at the time of starting is extremely low, typically of its rated value and, for example, when the chopper circuit is controlled by the depression of the vehicle's accelerator pedal, the period of conduction of the thyristor in the chopper circuit is extremely short in the period following the initial depression of the accelerator. Accordingly, even if the chopper circuit is defective, the vehicle will start abruptly, at full speed, with a consequent risk of grave injury to the operator and to any nearby pedestrians.

In such prior art arrangements, it must be born in mind that the main contacts must not be closed if either the chopper circuit or one of the control circuit for controlling the chopper circuit is out of order. If main contacts are closed with main thyristor of chopper circuit left short-circuited and by-pass contacts welded together, drive motor will run at full speed from the very beginning without any relation to the position of the accelerator, thus making operation of the vehicle very dangerous. Therefore, when starting the vehicle, chopper circuit and the control circuit must be checked first, and then main contacts are closed.

On the other hand, when the by-pass contact is closed, the full voltage of DC source is applied to the drive motor. Therefore, the speed of vehicle becomes maximum. Consequently, when the vehicle is stopping and is running at a minimum speed, if the by-pass contacts is closed, the operator will be lose control ability and the danger occurs. Accordingly, it must particularly bore in mind that the by-pass contacts must not be closed against the operator's will before the accelerator pedal is depressed sufficiently, or the vehicle's speed increases.

Therefore, a circuit for closing by-pass contacts is, generally, designed so as to close the by-pass contacts after delay period under the conditions of which the conduction ratio of chopper is advance, and thereby the speed of vehicle reaches a predetermined valve when the accelerator pedal is depressed sufficiently.

However, the chopper circuit utilized to control the speed of vehicle is by-passed with the by-pass contacts when the maximum speed and maximum torque is required, and full voltage is applied to the drive motor. Thence, if the chopper circuit is returned again to the chopping condition during the time the heavy load is applied to the motor, a commutation failure occurs due to lack of commutation capacity. The rotation speed of motor is controlled by the average voltage applied via the chopper circuit to the motor, and the maximum value of the current to be supplied to the motor is controlled by the control ratio of the chopper circuit when the motor is locked. The value of current is usually set to the suitable value such as overcurrent limiting value in proportion to the weight capacity of vehicle. The control ratio, in this case, is usually about 65%. On the other hand, when the maximum torque of motor is required, for example, when the vehicle desends a slope, the larger current than that of overcurrent limiting of chopper circuit is supplied to the motor by means of by-passing the chopper circuit. In this heavy load conditions, if the instruction is given to the chopper circuit for the purpose of starting again the chopper control (in this case, assume the accelerator pedal is slightly returned from the maximum depression), the maximum current will flow into the chopper circuit abruptly, and simultaneously the chopper will detect the current and will try to defend flowing the rush current. On the other hand, the control ratio is approximately 80% when the accelerator depression is slightly released, and thus the chopper will control the large current more than that of commutation capacity, the commutation failure occurs so that the normal operation of vehicle can not be performed.

To guard against it, in this kind of conventional chopper control circuit, the chopper circuit having the large commutation capacity is necessary and, as a result, the circuit becomes large in size and expensive.

In thus conventional apparatus and employing a DC chopper circuit, in order to detect the overcurrent, there has been proposed some overcurrent detector circuits in which a resistor is inserted into the main circuit in order to detect the voltage drop at the resistor, and a magnetic sensing element such as, for example, a transformer is interconnected to the main circuit of the apparatus where in the overcurrent is detected by sensing the induced voltage due to the variation of the magnetic flux.

In this kind of apparatus the source power is supplied to the motor via chopper circuit, and controlling the rotation speed of the motor will be performed by controlling the chopper circuit by means of another setting device and the control circuit. In addition, the current in the main circuit is detected by the overcurrent detector circuit, and detected signal is fed to the chopper circuit after amplifying within the control circuit.

Consequently, in the method of detecting the overcurrent with the detecting resistor, an amplifier is necessary because the loss of power is great in addition to the low sensing voltage. On the other hand, in the method which detects the current of main circuit by using the magnet sensor, for example, magnetic sensing element or transformer, there are drawbacks that the magnetic sensing element is expensive and, in contrary, an inexpensive element has a great drift dependent to the variation of the atmospheric temperature and, as a result, it can not be put to practical use, and, further, the transformer is of a large size and is expensive.

It is therefore an object of the present invention to provide an apparatus for electrically driven vehicle which improves the safty of the vehicle.

An another object of the present invention is to provide an apparatus for driven vehicle which can employ the chopper circuit effectively.

An additional object of the present invention is to provide an overcurrent detector circuit which is enable to detect the chopper current in the main circuit at high sensibility, and also can simplified the chopper control circuit.

A further object of the present invention is to provide an operation apparatus having contacts closing circuit which is safe and small.

Other object of the present invention is to provide an operating apparatus in which desired retarding torque can be obtained and, furthermore, the smooth braking and the cushioned start may be performed.

Further objects and features of the invention will be readily apparent to those skilled in the art from the specification and appended drawing illustrating a prefered embodiments.

FIG. 2 is a wiring diagram of an automatic breaking circuit in the circuit of FIG. 1.

Figure 1A:
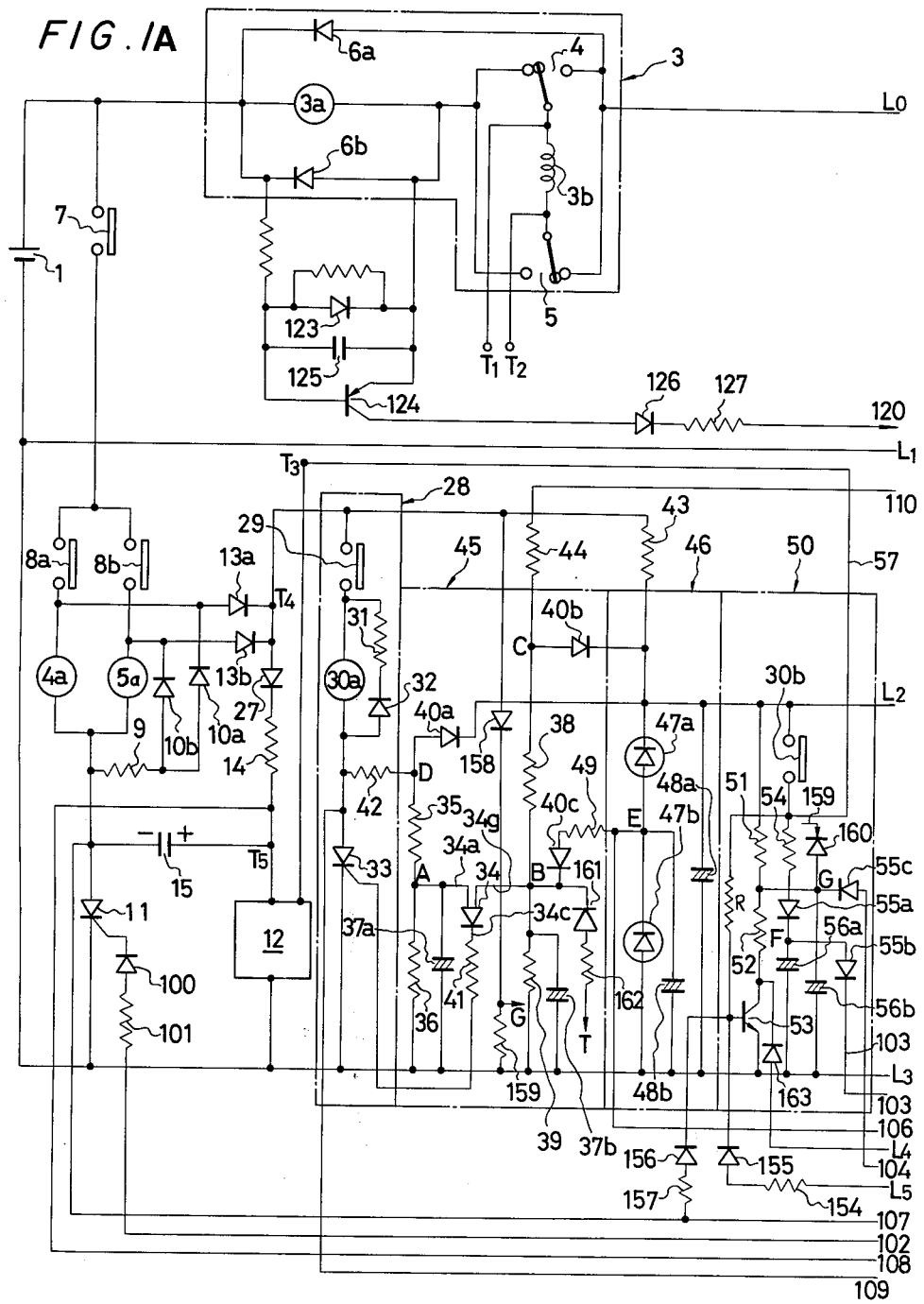
FIG. 1 is a schematic wiring diagram of an operating apparatus for electrically driven vehicle in relation to the embodiment of the invention.

FIG. 3 (A) and (B) are, respectively, the graphs showing the variations of the control ratio in proportion to the depression of an accelerator pedal.

FIG. 4 is a waveform showing the variation of motor current.

FIG. 5 is a waveform diagram of the detecting voltage in the overcurrent detector circuit of the invention.

FIG. 6 is a schematic diagram of the embodiment of the overcurrent detector circuit in accordance with the present invention.

FIG. 7 is a waveform diagram of the detecting voltage employed in the circuit of FIG. 6.

FIGS. 8A and 8B is the graphs depicting the control ratio of chopper circuit.

FIGS. 9A and 9B is the waveforms showing the load current varies as a function of the commutation voltage in the chopper circuit.

FIG. 10 is a wiring diagram of a plugging circuit according to the present invention.

In an operating apparatus for electrically driven vehicle of the embodiment shown in FIG. 1, the DC power from a DC source 1 is supplied to a electric motor 3 via a chopper circuit 2. The chopper circuit 2 is serially connected to the motor 3, and comprises a main switching element such as a main thyristor 2a, a series circuit including a first auxiliary switching element such as a first auxiliary thyristor 2b which is connected to the main thyristor 2a across a commutation capacitor 2d and a reactor 2e for eliminating the transient current, and a second auxiliary switching element, for example, a second auxirialy thyristor 2c. The electric motor 3 is interposed in the main circuit between the DC source 1 and the chopper circuit 2. The motor 3 has an armature winding 3a and a field winding 3b. A pair of contacts 4, 5 (forwards-reverse switch) is respectively connected between chopper circuit 2 and field winding 3b. A fly-wheeling diode 6b is connected in parallel with the armature 3a, and another fly-wheeling diode 6a is connected in pararrel with a series circuit of field winding 3b and armature windings 3a. Another series circuit connecting to the DC source 1 comprises a first accelerating switch 7, a control windings 4a, 5a of a contacts 4, 5. The switch 7 is closed when the accelerator pedal (not shown) of the vehicle is fully depressed by the operator.

A switch element, for example, a thyristor 11 is connected in series with relays 4a, 5a and the negative terminal of the DC source. An automatic braking circuit 12 is connected to the relays 4a, 5a through the diodes 13a, 13b and a resistor 14, and connected in parallel with the thyristor across the commutation capacitor 15. The automatic braking circuit 12 includes, as shown in FIG. 2, a thyristor 16, a transistor 17, a Zener diode 18 and etc, and connected as shown.

A by-pass contact closing circuit 28 comprises a second accelerating switch 29 which is closed by the fully depression of the accelerator pedal, control winding 30a of a by-pass contacts 30 for by-passing the chopper circuit 2 and a second switch element such as a thyristor 33.

The circuit 28 is connected in parallel with a main contacts closing circuit which includes the control windings 4a, 5a and the thyristor 11.

A conventional by-pass contacts closing circuit comprising means which includes a thyristor connected to a relay, a delay circuit having a resistor and a capacitor, and Zener diode inserted between a junction of resistor and capacitor and a gate terminal of the thyristor. When the charged voltage on the capacitor in which the current flows thereto through the control winding of contacts, the resistor exceeds the breakdown voltage of said Zener diode, the gate current will flow to the gate of said thyristor. In this case, as the gate current of the thyristor requires 2(mA), the resistor value must be relatively small value in response to the power source voltage and the breakdown voltage of the Zener diode. On the other hand, it is necessary to use the capacitor whose value is relatively large in order to maintain the preselected delay period. Further, when the voltage of DC power source such as battery voltage is exchanged (for example 36 volt to 48 volt), the delay period duely changes, therefore it is necessary to exchange the resistor value and the capacitor value in response to the battery voltage, as a result another important drawback is that the complex operation is required.

On the contrary, in the embodiment of the present invention, as illustrating in FIG. 1, a trigger element of a thyristor 33 for closing the by-pass contacts employs an oscilating element such as a programable unijunction transistor (hereafter called PUT) which is enabled to setting the oscilation voltage by means of the other circuit elements such as the gate resistors and the anode resistor of PUT.

Namely, an anode 34a of PUT 34 is connected to a junction A of a resistor 35 and a resistor 36. Resistors 38 and 39 are, respeclively, connected to a gate 34g, and a capacitor 37b is connected in parallel with the resistor 39. Anode of a diode 40b is connected to the resistor 38, and the cathode of the diode 40b is connected to an second accelerator switch 29 and a constant voltage power circuit 46 through a resistor 43. And a cathode 34c of PUT 34 is also connected to a gate of thyristor 33 across a resistor 41.

A delay circuit (or monitor circuit) 45 consists of the PUT 34, resistors 38, 39 and diodes 40a, 40b.

The constant voltage power circuit 46 comprises a series circuit having having diodes 47a and 47b, a capacitor 48a connected in parallel with said series circuit and a capacitor 48b which is connected in parallel with the Zener diode 47b.

The constant voltage power circuit 46 is connected in parallel with the monitor circuit 45, and a resistor 49 and a diode 40c are interposed with between a junction E of the diodes 47a, 47b and a junction B of resistors 38, 39 in order to compensate the minimum potential to be supplied to the gate 34g of PUT 34. A junction C of the resistor 38 and diode 40b is connected to a positive terminal of the chopper circuit, for example, an anode of main thyristor 2a across a resistor 44.

The operations of each the by-pass closing circuit 28 and the monitor 45 will be described as follows:

The constant voltage from the constant voltage power circuit 46 will be applied to the resistors 35 and 36. If the accelerator pedal is further depressed after the direction switch 8a (or 8b) is closed and then the accelerator switch 7 is closed in response to the depression of pedal. The potential at junction A will increase at a time constant preselected by the resistors 35 and 36 and the capacitor 37a, and will reached to a predetermined voltage.

When, at this time, the conduction ratio of the chopper circuit 2 advances and thence the gate voltage of PUT 34, that is, the potential at junction B is lower than that of junction A, the PUT 34 will be turned on. If the PUT 34 is made conductive state, the charge of capacitor 37a will be discharged through the anode 34a and cathode 34c of PUT 34, and the resistor 41, thereafter the thyristor 33 will be triggered. If the thyristor 33 is triggered to be conductive, the winding 30a will be energized, and the contacts 30 will be closed.

In contrary, in case the conduction ratio of chopper circuit 2 has been advanced simultaneously the gate potential of PUT 34 has been lowered before the second accelerator pedal switch 29 is closed, if, thereafter, the switch 29 is closed, the potential at junction A will become higher than that of junction B, and thereby PUT 34 will be caused to the conductive state. If the PUT 34 turns on, the thyristor 33 will be similary, turned on.

Even when the switch 29 has been switched to an ON state and the conduction ratio has been advanced, there will be some time delay during the vehicle driven by the motor 3 attains a preselected speed. In another wards, as there is spaced time interval after the conduction ratio has attained a preselected value, the speed of the vehicle reaches a predetermined value, the monitor circuit 45 is designed so that the by-pass contacts 30 is caused to close after a short time interval by delaying the conduction timing of the PUT 34 by means of the two delay circuit, one of which includes the resistors 35 and 36, and the other consists of the resistor 38 and the capacitor 37b.

Consequently, even when the conditions for closing the by-pass contacts 30 are established, if the speed of the vehicle is slow, the thyristor 33 will not be turned on and therefore the coil 30a will not be energized, as a result the by-pass contacts 30 will not be closed.

Further, in the monitor circuit 45, a resistor 49 and a diodes 40c are connected in series between the gate of PUT 34 and a junction E in order to compensate the minimum voltage to be prevented from the decreasing the output of PUT 34.

As will be obvious from the forgoing, a firing and delaying circuit of the thyristor 33 employed to close the contacts 30 utilizes the PUT 34, as a result, even if the battery voltage value is changed widely, the potential at junction D located between the resistors 35 and 42 will be maintained at a constant. A constant potential at the junction D causes the maximum value of the gate voltage of PUT 34 to be constant, and causes the time delay of ascilation of PUT to be constant. And, thus it is unnecessary to change the resistor and the capacitor within the time delay circuit.

Additionally, as the gate current for thyristor 33 is supplied by means of the discharging from the capacitor 37a without using the resistor 35, this will permits to use the large value of resistor 37a and small value of capacitor 35 in order to obtain a predetermined time delay and, as a result, there is a effect that the apparatus can be smallized and the cost of the apparatus can be eliminated.

A circuit 50 comprises a resistor 51 whose one terminal is connected to a positive terminal of the constant voltage power circuit 46, a transistor 53 whose collector is connected to the other terminal of resistor 51 across a resistor 52, and whose emitter is connected to a negative terminal of constant voltage power circuit 46, an auxiliary contacts 30b of contacts 30 that is interposed with between a base of transistor 53 and the positive terminal of the constant voltage power circuit 46. The contacts 30b becomes on and off in response to the on-off operation of contacts 30a. Further, the contacts 30b is connected to an anode of a diode 55a across a resistor 54, and a cathode of diode 55a is connected to a capacitor 56a. A capacitor 56a is also parallely connected between junction of the resistors 51 and 52, and an emitter of transistor 53. The junction between the auxiliary contacts 30b and the resistor 54 is connected through a lead 57 to the automatic breaking circuit 12.

An accelerator circuit 58 comprises an accelerator potentiometer 60 whose tap 60a's potential changes with response to the depression angle of accelerator, a first auxiliary resistor 59 of the potentiometer 60, a diode 61a whose anode is connected to the tap 60a, and a diode 61b connected across a resistor 62 to the diode 61a.

And a soft start circuit 63 includes a transistor 64 whose base and collector are respectively connected to the cathode of diode 61a and the positive terminal of constant voltage power circuit 46, a second auxiliary resistor 65 which is connected between the emitter of transistor 64 and the negative terminal of circuit 46, a resistor 66 and a capacitor 66 those which connected in parallel with the transistor 64, a diode 68a connected in parallel with to the resistor 67, and a resistor 69 and the base of transistor 64 is connected to an overcurrent detector circuit (thereafter described) by a lead 70. A junction I located between the emitter of transistor 64 and the resistor 65 is connected to a junction A in the circuit 50 by a lead 103 across the diode 55b.

An ON-pulse oscilator 71 for controlling the conduction ratio of the chopper circuit 2 utilizes a programerble unijunction transistor (PUT) 72 as a trigger element. This ON-pulse oscillator 71 is comprised with a diode 73, a charging resistor 74 connected to a cathode of diode 73, a transistor 75 whose emitter is connected to a resistor 74 and base is connected to a diode 68b and a resistor 69 within the soft start circuit 63, a charging circuit having a capacitor 76 connected to a base of transistor 75, a discharging circuit including a capacitor 76, and a pulse transformer 77 whose input winding in backwardly connected in parallel with the capacitor 76 through an anode 72a and a cathode 72c of PUT 74, the gate resistors 78–80 and diodes 81a and 81b, and further a synchronous circuit consisting of resistors 150, 151 and diodes 152 and 153, which is connected to the positive terminal P of chopper circuit 2 in order to synchronize the oscillator 71 with the chopper circuit 2.

In an OFF-pulse oscillator 82, a PUT 83 is used for triggering circuit, similar to the ON-pulse oscillator 71.

This oscillator 82 is comprised with a charging circuit which consists of PUT 83, resistors 85a and 85b those which respectively connected across the diodes 84a and 84b to an anode of PUT 83 and a capacitor 86a, an oscillation parts which comprises a discharging circuit including pulse transformer 87 whose inputs winding is connected across a resistor 85c to the cathode 83c of PUT 83, and an integration circuit having a resistor 85f and a capacitor 86b each connected in series with respectively.

Also, in the oscillator 82, a junction M between a resistor 85f and a capacitor 86b is connected through a diode 84d to an anode 83a of PUT 83, and also connects through diodes 84e and 89 to a positive terminal P of chopper circuit 2. The junction M is also connected, through a diode 84g by a lead 109 to an anode of thyristor 33 within the by-pass contactor closing circuit 28.

The cathode of PUT 83 is connected directly through a resistor 101 and a diode 100 by a lead 102 to the gate of thyristor 11, in order to use the OFF-oscillator 82 for a monitor circuit so as to close the main contacts 4 (or 5).

When the accelerator switch 7 and the manual switch 8a (or 8b) are closed together, the current will flow into the junction M through a lead 107, a resistor 851 and the diode 84c, and thereby the voltage of junction M will become a constant value. An electric charge will be accumulated on the capacitor 86b as the potential at junction M increases. After the voltage at junction M has increased, the current will be supplied to the anode of PUT 83 through the diode 84d. When the anode potential of PUT 83 overcomes the preselected voltage given by the resistors 85d and 85e, the PUT 83 switches to ON state, and the discharging current from the capacitor 86a is supplied to the gate of thyristor 11 across the cathode of PUT 83 and the lead 102. This results in the thyristor 11 becomes conductive state. If the thyristor 11 turns on, the voltage to be applied to the resistor 851 will be extinguished and no current will be supplied to the integration circuit consisting of the resistor 85f and the capacitor 86b. Additionally, as the time delay circuit consisting of the resistors 85a, 85b and capacitor 86a, and the integration circuit which includes the resistor 85f and capacitor 86b is respectively clamped by the diodes 84a and 84d, the time delay and integration circuits would not influence each other. And if the thyristor 11 becomes conductive state, the current will flow into the coil 4a (or 5a), as a result the main contacts 4 (or 5) is closed.

As was previously stated, the trigger element of the OFF-oscillator is employed in order to trigger the gate of thyristor 11, and the high power gating signal can be obtained. Accordingly, the effect is that a number of the parts and the cost of the apparatus can be eliminated. In addition to this, as the firing current to be supplied to the switch element for driving the contacts is presented from the oscillating elements, and the voltage to be applied to the charging circuit becomes constant, therefore the characteristics of the apparatus is improved.

Additionally, in the ON-pulse oscillator 71 and the OFF-pulse oscillator 82 having PUT, a low impedance means and high impedance means are connected to a gate side of PUT respectively, and the oscillators are designed so that the oscillatable frequency range is enable to be expanded widely.

Namely, a means is provided by decreasing the peak current to be supplied to the PUT at the beginning of switching on, and by increasing the minimum current supplied to the PUT after the turning on.

Figure 1B:
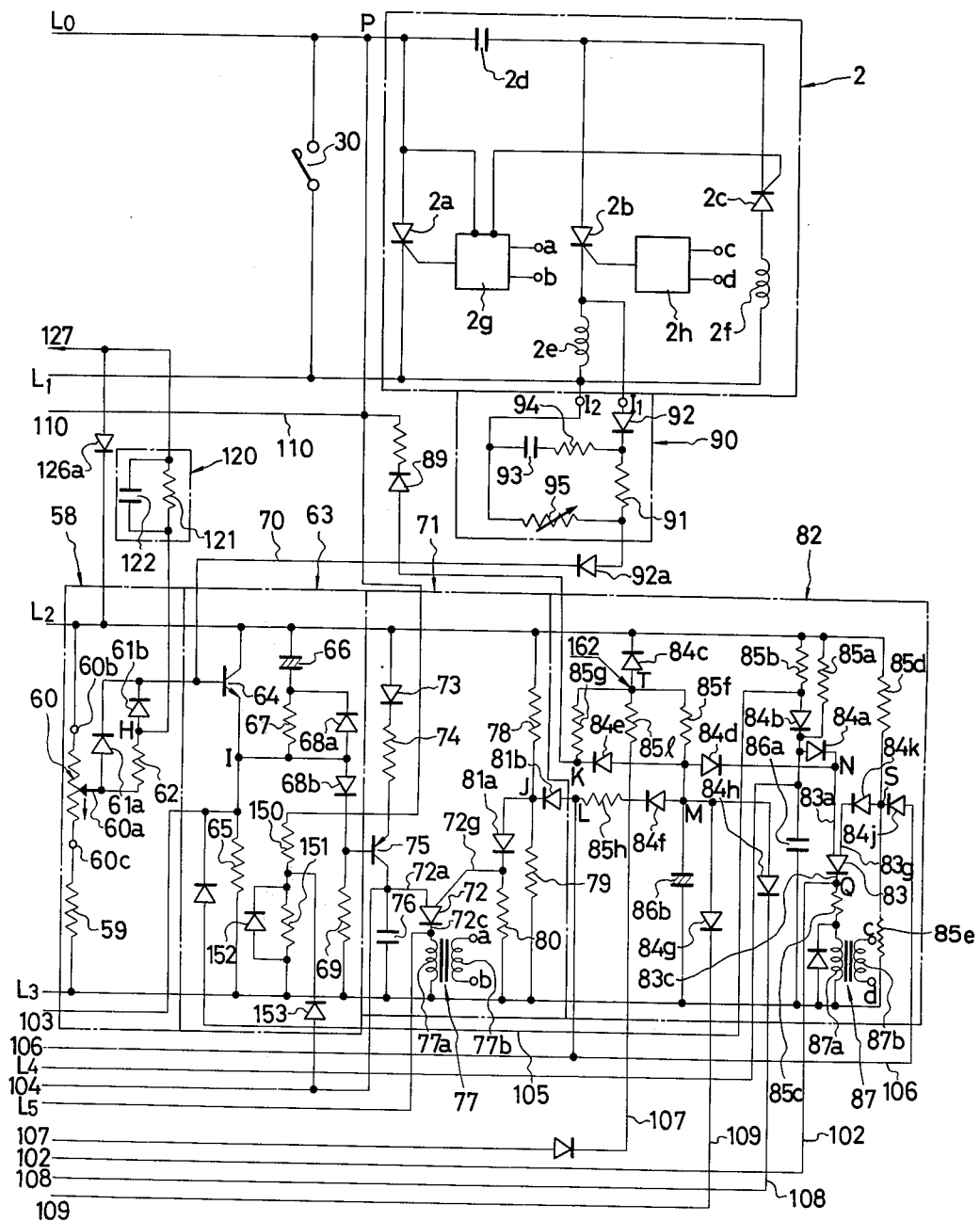

In this case, an oscillating voltage of the PUT is determined by means of the high impedance circuit and the voltage to be applied to the low impedance circuit is maintained lower than that of the high impedance circuit. Thereby the large current may be supplied to the gate of PUT after it switched to ON state, and as a result the oscillable frequency range will be expanded widely by utilizing the potential difference between the neutral point of these high and low impedance circuit. In thus oscillation circuits are shown in FIGS. 1A and 1B, that is, the high impedance circuit is formed by means of the resistors 78 (85d) and 79 (85e) connected to a gate side of PUT 72 (83). And, on the other hand, the low impeadance circuit is formed by connecting the high impeadance circuit through the diode 81b (84j) and the lead 106 to the junction of the constant voltage power circuit 46. In the oscillators 71 and 82, the peak current is supplied through the high impeadance circuit to the PUT at the beginning of turning on, and on the other hand, the gate current of PUT is presented through the low impeadance circuit.

Consequently, as the potential at the junction J (S) is higher than that of the low impeadance circuit, the peak-current triggering the PUT will be maintained at the relatively small value till the PUT is switched to ON state, and after the PUT turned ON, as the potential at the junction J (S) becomes lower than that of the low impeadance circuit, the gate current to the PUT will be supplied from the low impeadance circuit, and thence the valley current may increase.

In this manner, the oscillator of the apparatus in accordance with the present invention has the technical effect that sufficiently high stabilization and high reliability can be obtained in addition to simplifying circuit construction, as the frequency range can be expanded.

These circuits operate as follows:

FIGS. 3A and 3B shows the control ratio of chopper circuit 2 in proportion to the depression of accelerator pedal. When the pedal is depressed in accordance with the patern of FIG. 3B, the tap 60a of accelerator potentiometer (see FIG. 1 ) is removed toward the direction as illustrated by an arrow, and the potential at tap 60a is caused to decreased. If the potential at the tap 60a is low, the base potential of the transistor 64 will fall, and the transistor 64 becomes gradually conductive state. The emitter of transistor 64 is connected through the lead 105 to the charging circuit in the OFF-pulse oscillator 82, thus if the emitter potential is decreased, the charging time constant of the capacitor 86a will be large, and as a result, the oscillation periodical intervals of the OFF-pulse oscillator 82 will be enlonged. At this time, in the ON-pulse oscillator 71, the transistor 75 will become conductive state. If the transistor 75 turns on, the charging interval in the capacitor 76 will be shortened, and the oscillating periodical interval will be shortened. In order to synchronize the oscillator 71 with the oscillator 82, the cathode 72c of PUT 72 is connected through a resistor 154 and a diode 155 to the emitter of transistor 53, and similarly the cathode 83c is connected through a diode 163 to the collector of transistor 53. Consequently, the conduction ratio of the chopper becomes high as shown by a curve $l_1$ in FIG. 3A. During the heavy load has been given to the motor such as, for example the motor has been stalled, the conduction ratio $\alpha$ will be caused to a fixed value by means of an overcurrent limiting signal, as illustrated by a curve $l_4$.

Further, when the depression value of the pedal becomes maximum at time point $t_1$ as shown by a curve $a_2$ of FIG. 3B, the chopper circuit 2 will be shunted by means of the by-pass contacts 30, and simultaneously auxiliary contacts 30b is closed. If the contacts 30b is closed, transistor 53 will be caused to the conductive state, and then the electric decreases, stored in the capacitor 56b will be discharged, so that the potential at junction G will gradually increase up to the value predetermined by the resistors 51, 52 and so on. The junction F is connected through the diode 56b to the emitter of transistor 64 within the soft-start circuit 63. The junction G is also connected, through the diode 56c by a lead 104, to the collector of transistor 75. Thus, if the potential at junction F increase, the transistor 64 will turn off, and if the potential at the junction G decreases; the electric charge on the capacitor 76 will discharged through the diode 56c, the resistor 52 and the transistor 53, and then the ON-pulse oscillator will cease to oscillate.

Thus, the potential at the junction F is applied to the oscillators 71 and 82 those which present the ON and OFF signals to the chopper circuit 2, and the conduction ratio of the chopper circuit 2 will become the conditions as illustrated by a curve $l_4$ ($f_1, f_2$) in FIG. 3A. In practical, ON oscillators 71 has stopped oscillating.

Next, if an instruct to close the by-pass contacts is removed at the time point $t_2$ by slightly releasing the accelerator pedal, the by-pass contacts 30 will be opened, and thereafter the auxiliary contacts 30b will be opened.

In this case, the potential at junction F gradually falls by discharging current by means of the charging current into the capacitor 56a without varying abruptly.

After a brief time interval the potential at junction F decrease, the transistor 64 becomes conductive state. If the transistor 64 turns on, the base potential of transistor 75 increase, and therefore transistor 75 becomes conductive state. As the transistor is biased toward on state and the charging voltage in the capacitor becomes high, the oscilating period of the ON-pulse oscilator becomes short and, on the other hand, the oscilating period of the OFF-pulse oscilator 82 is caused to long. Thus, the conduction ratio gradually increases from the time point $t_2$.

Additionally, the conduction ratio increases gradually in response to the potential at junction F from a fixed value such as 30%, and soon after it will approach to a saturating value such as about 65%. And the building-up transcient time of the conduction ratio will be controlled by chosing the value of capacitor 56a as shown in the curve $l_4$ ($b_1, b_2$). The setting voltage at junction F will be variable by chosing the value of resistors 54 or 65, and thereby, also an initial conduction ratio will be variable as illustrated in the curves of FIG. 3A.

In this manner, if the by-pass contacts 30 is restored, the chopper current will increase from the lower value up to a preselected overcurrent limiting value e.g. 65%. During this interval, the voltage on the commutation capacitor 2d will also increase every chopping in the chopper circuit 2, and, as a result, the sufficient commutation capacity will be obtained.

When the auxiliary contacts 30b is ON state, the transistor 53 will also be ON state. Thereby the potential at junction G will become fairly small value, and the ON-pulse oscillator 71 is clamped by the diode 56c which is interposed between the junction G and the anode terminal 72a of PUT 72 through the lead 104. If by-pass contacts 30 is caused to OFF state, the contacts 30b will also become OFF state and thereafter the transistor 53 will be biased toward cutt-off. And if the transistor 53 is OFF state, the capacitor 56b will be charged by the current flowing through the resistor thereto, and the potential at junction G will gradually increase at the time constant preselected by an RC value of resistor 51 and capacitor 56b.

When the potential at junction G reaches preset value, the ON oscilator 71 will be released from clamping, and the chopper 2 will again operate. During this period, the chopper will be kept the non-operative state.

At this time, the motor's current will be a conditions as shown in FIG. 4. Namely, the variations of the motor's current are illustrated in FIG. 4.

During normal operation of chopper circuit, the motor's current will be a constant value such as, for example an overcurrent limiting value $i_o$ shown by the chopping curves $CH_1$ in FIG. 4. If the by-pass contacts 30 is closed at the time such as $t_1$, the motor's current will be reach to a value whose peak value is $i_p$. And if the by-pass contacts 30 is opened at the time such as $t_2$, the motor's current will begin damping. In other wards, the motor's current will flow through the fly-wheeling diodes 6a and 6b respectively, and then the energy which has been stored in the inductance of motor 3 will be eliminated.

However, if the chopper 2 begins to function again immediately after the time point $t_2$ as shown in a curve $CH_3$, the motor current will begin to increase during some interval in which the chopper is ON state. The motor current also will decrease from the value corresponding to the point $\alpha$ up to the value corresponding the point $f$ by the OFF instruction to be given to the chopper circuit, if the chopper commutates. Thereafter, the current from the motor will again increase to the value greater than that of the current corresponding to the point $f$, by means of the ON-instruction.

As discussed above, the voltage on the commutation capacitor 2d has already been a minimum value (e.g. approximately the source voltage) in some cases, and so the chopper circuit 2 must commutate the current at the point $f$ which is superimposed to the current of point $d$, a commutation failure is possibly occurred.

On the contrary, in the apparatus of the present invention, a delay timing for returning to the chopper control is provided by means of the time delay circuit 50, and the chopper operation can be started after the time $t_2 + t_c$ (point $e$) when the motor current $I_M$ has already been eliminated up to zero. Accordingly, the commutation is sufficiently carried out in spite of the low capacitor voltage, as the motor current reaches only the value of point $g$ which is smaller than that of point $f$, even if the chopper becomes switched state.

In this like manner, while the by-pass contacts 30 shorts the chopper circuit 2, the control ratio $\alpha$ has been reduced, and after the chopper conditions was returned by making the contacts 30 open, the control ratio $\alpha$ is caused to increase with a predetermined time delay. Furthermore, chopper controlling is made re-starting, after the energy which was stored in the inductance components of a load of the chopper has sufficiently reduced, in stead of the soon after by-pass releasing of the chopper.

As will be clearly understood from the foregoing, the following technical effects can be obtained by the chopper control circuit of the present invention:

The first effect is that the chopper circuit can be used effectively within a range of commutation capacity.

The second effect is that the sufficiently controlling of the load can be obtained by the chopper having small commutation capacitor.

The third effect is that it is unnecessary to design the chopper circuit so as to obtain a greater commutation capacity than that requested during normal operation, by means of increasing the capacity of the commutation capacitor. Therefore, the forth effect is that a good characteristics and economical chopper can be provided because it is unnecessary to use a selected semiconductor having a small turn-off time.

An overcurrent detector circuit 90 is shown in FIG. 1. The circuit 90 controls the current for restricting the overcurrent. The overcurrent detector circuit 90 comprises a resistor 91 connected to the base of transistor 64 in the soft-starting circuit 63, a diode 92 whose anode is connected to the resistor 91, a charging circuit including a capacitor 93 and a resistor 94 whose value is relatively small and connecting to a junction located between the diode 92 and the resistor 91, and a variable-resistor 95 connected through the resistor 91 to the charging circuit. Further its input terminals I₁ and I₂ are connected to the reactor 2e.

The induced voltage at the reactor 2e is detected by the circuit 90. A signal proportional to the peak value of the induced voltage will be impressed on the transistor 64 from the circuit 90.

A peak value Vp (or Vp') of the induced voltage is shown by a waveform 96 in FIG. 5. As the peak value Vp (or Vp') varies in proportion to the chopping current, it can be detected by the detector circuit 90, and thus the detected signal controls the chopper circuit 2. That is to say, if this voltage pulse is impressed on the detector circuit 90, the capacitor 93 will be immediately charged up to the peak value Vp of the voltage pulse 96 because the resistor value of resistor 94 is fairly small. In this case, as described about the positive voltage pulse Vp, and negative voltage pulse Vp' may be, similarly, detected. As the resistance components of resistors 91, 95 and of a base circuity is set to sufficiently small value, after the voltage was extinguished the charge of the capacitor 93 will not be almost discharged till the next cycle of the voltage pulse. And the voltage to be applied to to the base circuity of transistor 64 will be a constant value decided by the loat current and the current setting resistor 91 and 95, and this voltage used for a overcurrent limiting signal will be control the conduction ratio of chopper circuit 2.

FIG. 6 shows the other example, and in this embodiment the input terminals I₁ and I₂ of the detector circuit 90 are respectively connected to the terminals of reactor 2f which is connected in series with the second auxiliary thyristor 2c. The induced voltage in both terminals of the reactor 2f (shown by a curve 97 in FIG. 7) is detected by means of the circuit 90. And thence this detected signal will control the chopper current.

The overcurrent detector circuit 90, as discussed above, comprising a means which detects the variation of the voltage produced by the inductive resistance components which changes in response to the value of chopper current, and a means which controls this detected voltage. The circuit 90 employs the only few resistors and one or two capacitors or the like, and also needs not large mechanical components, for example the transformer. Thus, the controlling of chopper current can be easily and inexpensively performed.

It is, therefore, easy to detect the chopper current, and also the detected voltage is extremely high and apparent. Consequently, it is unnecessary to amplify and compensate the signal and, as a result the apparatus becomes high effective and unexpensive.

Additionally, the overcurrent detecting means according to the present invention is not limited to the above embodiments, and can be used other arranged circuits. Also the voltage detecting portions are not limited to the reactors 2e and 2f, it can be substituted for the corresponding portions in which the induced voltage changes in proportion to the chopper current.

In the electric vehicle, for example, the fork-lift truck wherein the speed control is carried out by means of controlling the average voltage of DC voltage to be applied to the DC motor via a chopper circuit, the plugging control circuit is used when the fork-lift truck desends a slope or changes running direction, and the chopper's conduction ratio should be increased in order to aquire the desired braking-torque. Further, the commutation capacity must be inevitably increased in response to the rising of conduction ratio. Particularly when the input voltage of the chopper is low, as the commutation failure occurs, it is necessary to insert the compensating elements into the control circuit for the purpose of elevating the commutation capacity.

As seen in FIG. 1, in the apparatus of the present invention, the plugging control circuit is comprised with a diode 123 connected in parallel with the armature diode 6a and a transistor 124 which is biased forward direction and turns on in the reverse rotation of motor 3. A time delay circuit 120 is comprised with a resistor 121 and a capacitor 122. The time delay circuit 120 is connected through a diode 126 and a resistor 127 and also connectd through the diode 61b to the base of transistor 64 and further connected across the resistor 62 to the tap 60a of accelerator potentiometer.

In normal operation, if the tap 60a is located to the side of terminal 60c, the emitter potential of the transistor 64 will be minimum, and thus the collector current of the transistor 75 will become maximum. This collector current will cause the capacitor 76 in the oscillator 71 to be charged. When the charging voltage of the capacitor 76 reached to the operation voltage of the oscillator 71, a pulse signal from the oscillator 71 is supplied to main thyristor 2a in the chopper circuit 2, and thereby the thyristor 2a turns on. If the thyristor 2a switches on, the motor 3 will be driven by the source voltage applied to the armature 3a.

When the tap 60a is situated at the side of terminal 60b, the emitter voltage of transistor 64 will be maximum, and the OFF-interval of the chopper will become maximum. When the OFF-interval is maximum, the speed of motor becomes minimum. On the contrary, if the tap 60a is located to the side of terminal 60c, the OFF-interval will become minimum and the speed of motor will become maximum. In this case, the chopper circuit 2 is, so called, of the hybrid type because the emitter of transistor 64 is connected by the lead 102 to the resistor 85b in the OFF-pulse oscillator 82, and the ON-time and OFF-time are changeable, respectively.

In thus manner, in the normal forwarding operations, as the oscillating frequency is decided by a position of tap 60a, a periodical ON-OFF interval can be changed freely. Thus, the average voltage to be supplied to the motor can be controlled at its option.

In the next place, if the counter-current braking is done by changing-over the contacts in the field winding 3b, an inverse voltage will be induced in the armature 3a. This inverse voltage will cause a current to flow through the armature diode 6a, and then the potential at the emitter of transistor 124 will be higher than the base potential of it, so the transistor 64 will be caused to the conductive state. If the transistor 124 switches on, the current will be flow into the oscillating portions through the transistor 124, diode 126, the resistor 127, the time delay circuit 120 (or a diode 126a) and the potentiometer 60. Consequently, as the potential at junction H, that is, the base voltage of transistor 64, increases, the transistor 64 is biased toward the conductive state. If the transistor 64 switches on, the time interval which the charging voltage on the capacitor 76 reaches to the operating voltage of the oscillator, will become longer than the charging interval in normal forwarding operation.

In the conventional plugging control circuit which does not have the time delay circuit 120, the conduction ratio in forwarding is about K% (e.g. 80 to 90%), as shown in FIG. 8A. On the other hand, the conduction ratio in plugging is about 10%, as seen in FIG. 8A. If the speed control in forward driving is carried out by maintaining the conduction ratio to 10% and, thereafter, controlling of retarding torque in plugging is taken place by keeping the conduction ratio to 10%, both the crest value $i_{p1}$ of the load current and the peak value $V_{c1}$ increase from the time $t_1$ at the mode of the curves in FIG. 9A. Then, the crest value $i_{p1}$ becomes great more than the peak value $V_{c1}$ at the time $t_3$ and, as a result, the commutation failure of the chopper circuit occurs because of the lacks of commutation voltage $V_{c1}$.

In this conventional plugging control circuit, if the retarding torque control would be performed by means of increasing the capacity of the commutation capacity and the source voltage, the commutation failure does not occur because the commutation voltage $V_{c1}$ is constantly great more than the peak value $i_{p1}$ of the load current as shown in FIG. 9A. However, in this case, the conduction ratio of the chopper circuit rapidly increase to the 10% and the retarding torque becomes maximum in response to it.

On the contrary, the plugging control circuit of the present invention has the time delay circuit 120. Therefore, at the beginning of plugging the potential at junction H is built up swiftly by means of the capacitor 122, and becomes equal to the voltage value of the constant voltage power source 46. And, in course of time, its potential is gradually eliminated and approaches a preset value determined by the voltage dividing ratio of resistor 62, potentiometer 60 and auxiliary resistor 59.

Accordingly, as can belseen in FIG. 8B, the charging voltage on the capacitor 122 increases from $t_1$ to $t_2$, and also the potential at junction H is lowered. The OFF-time gradually becomes short as the potential at junction H becomes low, and thus the conduction ratio of chopper circuit 2 increases softly as shown by the interval $t_1$ to $t_2$ in FIG. 8B. Finally, the maximum retarding torque can be aquired by setting the conduction ratio to approximately 10%.

As discussed above, in the present invention, the conduction ratio of the chopper circuit can be controlled by using the time delay circuit, and the necessary retarding torque can be provided by controlling the conduction ratio.

Further, as can be seen in FIG. 9B, the peak value $V_c$ of the commutation voltage becomes always greater than the peak value $i_{p2}$ of the load current. Therefore, the chopper circuit can be prevented from the commutation failure due to the lacks of commutation energy. This enables to plugging and soft-starting in addition to be enable to enhance the control efficiency of the chopper circuit.

Another plugging control circuit of the present invention is shown in FIG. 10.

In this plugging control circuit, the time delay circuit is formed by the resistor 127 and the capacitor 122, and the detection voltage which detects the plugging is applied to the auxiliary resistor 59 through the resistor 127. And thus, the voltage at the tap 60a will be increased and a transistor 170 will be turned on. If the transistor switches on, the charge of capacitor 171 will be discharged and the base current in the transistor 170 will be minimal, so the start timing of the oscillator will be delayed, and thus the conduction ratio will be eliminated up to 10%. Thereafter, the base potential in the transistor 75 falls at a time constant decided by the resistor 65, the capacitor 171, and, therefore, the ON-time becomes long. At this time, the conduction ratio will gradually increase up to about 10% and, accordingly, the retarding torque becomes maximum.

The circuit of FIG. 1 operates as follows:

The vehicle can be operated by closing accelerating switch 7, relay 4a (or 4b) and relay 4a (or 5a), and successively, the forward-reverse main contactor 4 (or 5).

It must be born in mind that the main contacts must not be closed if either the chopper circuit 2 or any one of logic circuit is out of order. If main contacts 4a (or 5a) is closed with main thyristor 2a of chopper circuit 2 left short-circuited and by-pass contacts 30 (the contact which applies full voltage to drive motor 2) welded together, drive motor 2 will run at full speed from the beginning without any relation to the position of the accelerator, thus making operation of the vehicle, very dangerous, as previously discussed. Therefore, when starting the vehicle, chopper circuit 2 and the logic circuit are checked first, and then main contactor 4a (or 5a) is closed. Thyristor 11 must, of course, be turned on when closing the main contactor 4a, 5a. The gating signal for the thyristor 11 is provided by the monitor circuit 82 which checks whether or not the main contactors 4, 5 is ready for closure.

Thyristor 11 cannot turn on, and thus the main contactor cannot be closed, if the chopper circuit 2 or the logic circuit are out of order, that is to say if:

1. The automatic breaking thyristor 16, whose anode is connected to the resistor 14 and the capacitor 15, is initially short-circuited due to an internal malfunction;
2. the by-pass contacts 30 have welded or main thyristor 2a of chopper circuit 2 has been destroyed (i.e. short-circuited);
3. the constant voltage power circuit malfunctions;
4. the thyristor 33, whose anode is connected to the junction M by the lead 109, is open or short-circuited.

If there is a fault in the control unit while the vehicle is running at a minimum speed, the operator will lose control ability and the vehicle will run, abruptly, at full speed. Therefore, it is necessary to provide an automatic braking circuit 12 which causes thyristor 11 to turn off and switches off chopper circuit 2 to automatically stop the vehicle. However, automatic braking circuit 12 must not function when by-pass contactor 30 is closed, since the vehicle is running at full speed at that time. Chopper circuit 2 can be switched off by opening the main contactor 4, 5. This can be done by turning off the thyristor 11. Thus the automatic braking circuit 12 is used to turn off thyristor 11 by automatically detecting malfunctions in the chopper circuit 2.

Chopper circuit 2 is of the hybrid type. In the middle of chopping cycle, transistor 17 will turn off if the thyristor 2a is on. On the other hand, transistor 17 will be turn on if thyristor is off. During the off-phase of thyristor 2a, base current is supplied through resistor 23, and thus transistor 17 is turned on. If thyristor 2a remains turn on, transistor 17 will turn off since the base current is by-passed through diode 27a, 27b and terminals $T_1$, $T_2$, main contactor 4, 5, and thyristor 2a. On the other hand, if transistor 17 is turned off, capacitor 19 is charged through diode 21 and resistor 20. When the charging voltage across capacitor 19 attains the breakdown voltage of Zener diode 18, thyristor 16 is turned on. If the thyristor 16 is turned on, the thyristor 11 (which is at this time conducting) will be turned off by the electric charge on capacitor 15 which has the polarity shown in FIG. 1. The main contactor 4 (or 5) is then opened and chopper circuit 2 is switched off. In this case, thyristor 16 remains turned on and, so, the gate current of thyristor 11 is by-passed by the thyristor 16.

In order to re-start the vehicle, the accelerating pedal must be released to make thyristor 16 turn off. If the by-pass contactor 30 is closed, the circuit operation would be as if thyristor 2a were turned on continuously Accodingly since the automatic braking circuit 12 must not operate at this time, base current is supplied to transistor 17 from constant voltage power circuit 46 through contacts 30b, when relay 30a is energized and contact 30 is closed. Therefore, transistor 17 can remain on to thereby prevent operation of the automatic braking circuit 12.

If by-pass contacts 30 is closed, full voltage will be applied to drive motor 3 and the vehicle will again move at maximum speed. Therefore, closure of by-pass contacts 30 when the vehicle is stopped or moving at slow speed may creat a dangerous condition. It must be closed until accelerating pedal has been depressed sufficiently or while the vehicle is running at a low speed. Monitor circuit 45 (for closing the by-pass contactor 30) can be divided into two sections, (1) a monitor circuit for judging the by-pass contact closure and (2) a delay circuit.

Relay 30a must be closed under the followig conditions:

1. The accelerating pedal is depressed sufficiently (i.e. more than 80–90% of its maximum travel).
2. Main contactor 4 is closed.
3. The conduction ratio in the chopper circuit has reached a specified level.

To close by-pass contactor 30, accelerating pedal switch 30 must be closed and thyristor 33 must be fired.

The gate circuit of thyristor 33 is connected to the cathode of PUT 34 through resistor 41 of the monitor circuit 45, as shown. If any one of the above-mentioned circuit conditions are not established, PUT 34 will not turn on and thyristor 33 cannot turn on.

Namely, relay 30a cannot be energized and contact 30 cannot close.

The by-pass contactor 30 will close as a matter of course after main contactor 4 (5) is and the chopper circuit has been advanced. In normal accelerator operation, accelerating switch 7 is closed to actuate relay 4a, and relay 30a is energized and contact 30 of relay 30a closed, after switch 29 has been closed by depressing accelerating pedal further. Accordingly, there is no problem in case of fault. However, energization of relay 4a (or 5a) must be preceded by energization of relay 30a, even when the vehicle is started.

Consequently, the circuit of FIG. 1 is designed so that thyristor 16 (shown in FIG. 2) cannot turn on before the thyristor 11 does. If the thyristor 11 is OFF state after the accelerator switch 7, the switch 8a (8b) and contacts 29 has switched on, the current will be supplied from the anode of thyristor 11 to the gate 34g of PUT 34 through the lead 107 across the resistor 851, a resistor 85m and a diode 841. Thus the potential at the gate 34g of PUT will be elevated and the potential at junction B will become higher than at junction A. Therefore, the thyristor cannot be turn on and relay 30a also cannot be energized so the by-pass contacts 30 cannot be closed.

If the conduction ratio of chopper circuit is low, the average voltage supplied to thyristor 2a will be high. On the contrary, the average voltage will be low when the conduction ratio of thyristor 2a is high.

The voltage applied to thyristor 2a is applied to the gate 34g of PUT 34 through the resistors 44 and 38. Therefore, the PUT will not be turned on and the thyristor cannot be turned on. On the other hands, the PUT will be turned on and the thyristor 33 will turn on when the conduction ratio increases and the average voltage of thyristor 2a falls below the voltage of junction A determined by the resistors 35 and 36.

When the above conditions for closure of chopper circuit 2 are satisfactorily met, the capacitor 37a will begin to charge through the resistors 35 and 42. The thyristor 33 is turned on after the lapse of a specified delay time that is dependent on the time constant of resistor 35 and capacitor 37a, and relay 30a is energized so that the by-pass contacts 30 can be closed.

The voltage of DC power source 1 may fluctuate widely during charging or heavy charging current. On the other hand, the constant voltage power source is required in order to stabilize the function of ON and OFF oscillators. The circuit of FIG. 1 thus includes a constant voltage power circuit comprising a pair of Zener diodes 47a, 47b and a pair of capacitors 48a, 48b. The junction E located between Zener diodes 47a and 47b is connected through a lead 106 and the diode 81b to the ON oscillator 71 and also connected through the diode 84j to the OFF oscillator. In this circuit, if the Zener diode 47 is malfunctioning, the voltage to be applied to the junctions S and M in the OFF-pulse oscillator 82 will become low voltage depending on the Zener diode 47b, and the capacitor 86 will not be charged so the PUT 83 cannot be turns on. If the Zener diode 47b is short-circuited, the potential at junction E will become zero, therefore the voltage at junction S will become low voltage whose value is decided by the dividing ratio of resistors 85d and 85e, and also the voltage at junction M becomes extremely low value which is determined by the dividing ratio of resistors 85f, 84h and diode 84f, and charging voltage of capacitor 86b will be extremely low so the put 83 cannot be triggered. Therefore, the thyristor 11 and relays 4a (5a) will remains OFF state.

An important feature of the invention is the fact that, as described previously, a first synchronizing circuit for synchronizing the ON-pulse oscillator 71 with the chopper circuit 2 is arranged to the apparatus. The first synchronizing circuit is composed with resistors 150 and 151 and diodes 152 and 153, and each is connected as shown in FIG. 1, respectively. Further, the apparatus is arranged to a second synchronizing circuit to synchronize the ON-pulse oscillator 71 with the OFF-pulse oscillator 82. The second synchronizing circuit includes the diodes 155, 163 and resistor 154, and each connects as shown, respectively. When the anode voltage of main thyristor 2a is zero or negative, the capacitor 76 will be almost clamped. And this clamping will be released as the anode voltage increases, and the ON oscillator 71 will begin to oscillate. If the oscillator 71 operates, the transistor will turns on and, thus, the capacitor 86a will be discharged through the transistor 53. And if the capacitor 86a discharges, the OFF oscillator 82 will stop oscillating so the oscillator 82 will synchronize with the ON oscillator 71.

During starting, the ON-pulse must not operate until thyristor 11 turns on. If an ON-pulse is generated before thyristor 11 turns on, thyristor 2a will be short-circuited, and, thus, the anode potential of PUT 83 is lowered and thyristor 11 is not turned on. Fur this reason, the main contact 4 (5) cannot close. To avoid this, the ON-pulse oscillator 71 is clamped by means of the anode potential of thyristor 11.

Namely, another important feature of the invention is fact that a first clamping circuit is arranged between the time delay circuit 50 and the thyristor 11, that is, the first clamping circuit includes the diode 156 and the resistor 157, those which are connected serially between the base of transistor 53 and the anode of thyristor 11.

During starting, if the switch 8a (8b) is closed slowly, the anode voltage will be applied through resistor 157 and diode 156 to the base of transistor 53, and the transistor 53 will be turned on. If the transistor switches on, the electric charge of capacitor 76 within the ON-pulse oscillator 71 will discharge through lead 104, diode 55c and transistor 53, and, thus, ON-pulse oscillator 71 is clamped.

On the other hand, if the switch 8a (8b) is operated swiftly, the charge of capacitor 76 and 56b will not be discharge completely, and the ON-pulse oscillator 71 cannot be clamped. To work out this problem, a second clamping circuit is arranged between the constant voltage power circuit 46 and the time delay circuit 50. The second clamping circuit is comprised with the diode 158, the resistor 159 and the diode 160. The series circuit of resistor 159 and diode 158 is connected in parallel with the constant voltage power circuit 46, and the diode 160 is inserted between the junction M and the junction of diode 158 and resistor 159. Accordingly, even if the switch 8a is closed abruptly, the electric charge of capacitor 76 and 56b will be discharged swiftly, and the ON-pulse oscillator 71 can be clamped.

In addition, the ON oscillator must not operate while by-pass contacts 30 are closed. If motor current is interrupted while chopper circuit is by-passed, contact wear will be excessive and contact life will be shortened.

When stopping the vehicle, the ON oscillator must cease functioning after the accelerating switch has been opened. If accelerating switch 7 is opened to stop the vehicle, the main contacts 4 (or 5) will be opened and the vehicle will be stoped. However, the main contacts 4 (or 5) must not interrupt the motor circuit.

Thus, the chopper circuit 2 must be switched off before the opening of main contacts 4. The ON oscillator is thus disconnected when accelerating switch 7 has been opened, but the OFF oscillator is allowed to remain functioning for a vehicle. Thus, chopper circuit 2 has already been switched off when the main contacts 4 (5) are opened.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An operating apparatus for an electrically driven vehicle having a main circuit wherein power is fed from a DC source to an electric motor, via a chopper voltage regulation circuit, the apparatus comprising:
   a. an accelerator circuit including a variable resistor-transducer coupled to an accelerator pedal of said vehicle;
   b. a signal generator including a control circuit for controlling said chopper circuit, and controlled by said variable resistor-transducer, for generating a gating signal for said chopper circuit, dependent on the instantaneous position of said accelerator pedal;
   c. an overcurrent detector circuit controlling the current of said chopper circuit, by detecting the variation of voltage in accordance with the current of said main circuit, said overcurrent detector circuit comprising means for detecting the variation of voltage produced by the inductive resistance component which changes in response to the value of chopper current, and means for controlling the chopper current of said chopper circuit.

2. An operating apparatus as recited in claim 1 wherein said overcurrent detector circuit comprises a first resistor connected to a base of transistor, a diode connected to said first resistor, a charging circuit comprising a capacitor and a resistor whose resistance value is relatively small and connected to a junction located between said first resistor and diode, and a resistor connected through said first resistor to said charging circuit.

3. An operating apparatus as recited in claim 1 further comprising a first relay for supplying said DC source to said motor, a first switching means connected in series with an armature winding of said first relay, and a constant voltage power source for supplying a constant voltage to said signal generator.

4. An operating apparatus as recited in claim 3 wherein said first switching means includes a thyristor, and an output of said control circuit for controlling the chopper circuit and being connected to the gate of said thyristor to gate the same into conduction when operation of said chopper circuit and said constant voltage power circuit are both normal.

5. An operating apparatus according to claim 4, wherein said control circuit comprises an ON-pulse oscillator and an OFF-pulse oscillator, said control circuit including an oscillation element with oscillation voltage adjustable by means of another element, and a time delay circuit.

6. An operating apparatus according to claim 5, wherein said ON-pulse oscillator comprises a time delay oscillating circuit including a charging circuit and a trigger element with output for triggering said first switching element and for controlling said chopper circuit.

7. The operating apparatus according to claim 5 including a first clamping circuit for clamping the ON-pulse oscillator by means of the anode potential of the thyristor for closing main contacts, and a second clamping circuit for clamping the ON-pulse oscillator.

8. The operating apparatus according to claim 5, wherein each said oscillators includes a programmable unijunction transistor, a time constant circuit having a resistor and a capacitor each connected to an anode terminal of said programmable transistor, a high impedance circuit consisting of a pair of resistors each connected to a gate terminal of said programmable unijunction transistor, and a low impedance circuit connected to said high impedance circuit, the peak current being supplied through said high impedance circuit to said programmable unijunction transistor at the beginning of turning on, and the gate current to said programmable unijunction transistor being transmitted through said low impedance circuit.

9. An operating apparatus according to claim 5, wherein said oscillation element comprises a programmable unijunction transistor, and said time delay circuit comprises a resistor and a capacitor.

10. An operating apparatus for an electrically driven vehicle having a main circuit wherein power is fed from a DC source to an electric motor, via a chopper circuit, the apparatus comprising a relay for supplying said DC source to said motor, a first switching means connected in series with the armature winding of said relay, an ON-pulse oscillator and an OFF-pulse oscillator and a constant voltage power source for supplying said ON-pulse oscillator and said OFF-oscillator, a second relay for supplying the full voltage of said DC source by short-circuiting the chopper circuit, a second accelerating switch and a second switching means connected in series with the armature winding of said second relay, a monitor circuit for closing a by-pass contacts parallely connected said chopper circuit, a conduction ratio adjusting means for determining the oscillating frequency of ON-pulse oscillator and OFF-pulse oscillator for controlling the chopper circuit when the by-pass contacts operates, and a time delay circuit for causing said conduction ratio to be substantially small while said chopper circuit is short-circuited by said by-pass contacts and for increasing said conduction ratio as the commutation capacity increases, when returning to chopper control, and for adjusting a transient delay of said conduction ratio.

11. An operating apparatus according to claim 10 wherein said ON-pulse oscillator includes a trigger element such as a programmable unijunction transistor and charging and discharging circuits which includes a switching element interposed between a resistor and a capacitor, said OFF-pulse oscillator having a programmable unijunction transistor, a conduction ratio adjusting circuit including an accelerator circuit for alternating said switching element to conductive state and non-conductive state, an auxiliary contacts becoming on and off in accordance with the operation of said by-pass contact, a first time delay circuit including a first charging and discharging circuit comprising a resistor and a capacitor, each connected in series with said auxiliary contacts of the by-pass contacts, and a second time delay circuit including a second charging and discharging circuit comprising a resistor and a capacitor, each connected in parallel with said auxiliary contacts.

12. An operating apparatus according to claim 10, wherein said second switching means includes a thyristor for energizing said armature winding of the second relay for closing the by-pass contacts, said monitor circuit including a time delay circuit and a programmable unijunction transistor with cathode electrode connected to the gate of said thyristor.

13. An operating apparatus according to claim 10, wherein said conduction ratio adjusting circuit includes the accelerator circuit having an accelerating potentiometer with tap moved by the depression of said accelerating pedal, a transistor alternating conductive state and non-conductive state dependent on the voltage of said tap, and a soft-starting circuit having a resistor and a capacitor each connected in parallel with said transistor for re-starting the operation of the chopper circuit after the energy stored in an inductive resistance of said motor was removed when said by-pass contacts had released.

14. An operating apparatus according to claim 12 further comprising a plugging control circuit which includes a time delay circuit for changing the conduction ratio in proportion to a time interval, and means for operating said time delay circuit in counter-current braking for acquiring a predetermined retarding torque by eliminating the conduction ratio of said chopper circuit.

15. The operating apparatus according to claim 14, wherein said time delay circuit includes a parallel circuit of a resistor and a capacitor.

16. The operating apparatus according to claim 12, wherein said time delay circuit includes a series circuit formed by a capacitor and a resistor, and a transistor with base terminal connected to a tap of the accelerator potentiometer.

* * * * *